United States Patent [19]

Shoop

[11] 4,057,671
[45] Nov. 8, 1977

[54] HEATED LAMINATED WINDOW AND METHOD OF ASSEMBLING SAME

[75] Inventor: George W. Shoop, Pittsburgh, Pa.

[73] Assignee: PPG Industries, Inc., Pittsburgh, Pa.

[21] Appl. No.: 591,218

[22] Filed: June 27, 1975

[51] Int. Cl.² .................. B32B 15/00; B60L 1/02
[52] U.S. Cl. ........................ 428/208; 52/171;
    219/203; 428/328; 428/423; 428/433; 428/458;
    428/461
[58] Field of Search .............. 219/522, 547, 543;
    428/434, 433, 210, 430, 426, 204, 328, 432, 208,
    209, 423, 458, 461; 338/308, 309; 52/171

[56] References Cited

U.S. PATENT DOCUMENTS

| | | | |
|---|---|---|---|
| 2,710,900 | 6/1955 | Linder | 219/553 |
| 2,813,960 | 11/1957 | Egle | 219/345 |
| 3,223,829 | 12/1965 | Davy et al. | 219/522 |
| 3,659,079 | 4/1972 | Whittemore | 219/522 |
| 3,721,594 | 3/1973 | Tarnopol et al. | 428/432 X |
| 3,734,698 | 5/1973 | Postupack et al. | 219/522 |
| 3,947,618 | 3/1976 | Gruss | 428/433 X |

Primary Examiner—Thomas J. Herbert, Jr.
Assistant Examiner—R. Eugene Varndell, Jr.
Attorney, Agent, or Firm—Edward I. Mates

[57] ABSTRACT

A transparent electroconductive window comprising an assembly element supporting a circuit portion electrically coupled to a novel self-soldering bus bar consisting essentially of particles of a finely divided highly electroconductive metal, such as silver, dispersed within a metal alloy having a fusion point between about 70° C. and about 150° C. A mixture of finely divided metal and of said alloy is applied to an assembly element along one or more lines in electrical contact with an electroconductive heating element carried by said assembly element. The one assembly element is assembled with other assembly elements to form a sandwich that is laminated at a temperature higher than the fusion point of the metal alloy to form a transparent electroconductive window having highly conductive, self-soldering bus bars formed along said lines.

19 Claims, 5 Drawing Figures

HEATED LAMINATED WINDOW AND METHOD OF ASSEMBLING SAME

BACKGROUND OF THE INVENTION

1. Field of the Invention

The present invention relates to transparent electroconductive windows comprising a non-electroconductive assembly element, an electroconductive circuit portion carried by said element and one or more bus bars, adapted to be coupled to a source of electric potential to provide an electrical current through said circuit portion that is capable of heating the window. While the window may comprise a single assembly element in the form of a sheet of rigid, transparent material, the present invention has special utility in laminated windows.

Transparent electroconductive windows have been used in aircraft particularly for the purpose of removing fog, mist or ice that forms on a surface of the windshield when the window is exposed to extremely low outside temperatures while the temperature inside the aircraft is relatively warm. Heated windows of this type are also finding use in other vehicles, such as railway cars, boats, and custom automobiles, in other window structures such as buildings, and in transparent windows for freezers and the like. Essentially, the window comprises a base or substrate of rigid transparent non-electroconductive material, such as glass or a well known plastic substitute for glass, that supports an electroconductive coating which may be either a matrix of thin wires of thin strips of bus bar material or a continuous transparent electroconductive coating such as tin oxide and/or other metallic oxides or metals, which coating is in electroconductive contact with one or more bus bars. The latter are adapted to be connected to a source of potential whenever it is desired to apply electric current through the electroconductive coating so as to heat the window and dissipate a build-up of mist or ice that normally forms on a surface of the window under certain atmospheric conditions.

Since the transparent electroconductive coating is usually very thin and fragile, it has been the custom to protect it by laminating the coated substrate to additional sheets or layers of transparent material, using well known interlayer materials such as polyvinyl acetals, particularly plasticized polyvinyl butyral, and polyurethanes. Either or both other plies may be of glass or a transparent plastic.

In order to supply electrical energy for powering the transparent electroconductive coating, it is necessary that the coating be connected to a bus bar, which serves as a distributor of electrical energy from a voltage source to the electroconductive circuit portion. The bus bar must distribute the electrical energy uniformly to provide uniform heating over the entire coated surface. In addition, the electroconductive coatings usually used cannot withstand localized high currents without damage to or even destruction of the laminated window. When the coating is marred locally, an area of high current density may develop, which results in localized high heating.

It has also been suggested to use various materials other than a rigid transparent sheet to support the electroconductive circuit portion. For example, the thermoplastic interlayer material which is used to adhere a glass sheet or a sheet of other rigid transparent material to another sheet may itself serve as a carrier for narrow electroconductive wire. Also, a flexible interlayer may serve as the carrier for a transparent electroconductive circuit portion in the form of a coating bonded thereto. However, it is usually necessary that the circuit portion that provides the heat for the window be protected from scratching and other causes of damage, and also that the bus bar to heating element contact be maintained adequately throughout the entire area of contact between the bus bar and the electroconductive circuit portion of the heating element.

Regardless of the nature of the support provided in a window for the electroconductive circuit portion, the need existed for a suitable bus bar that is capable of making adequate contact with the circuit portion and of preventing or minimizing the effect of hot spots on the application of an electrical potential to said circuit portion.

2. Description of the Prior Art

Transparent electroconductive windows having ceramic silver bus bars making electrical contact with a transparent electroconductive coating are disclosed in many patents, including U.S. Pat. Nos. 2,710,900 to Linder and 2,724,658 to Lytle. In order to avoid bus bars which develop excessive stresses in the glass when the bus bars are applied to a glass sheet surface, the bus bar in these patents preferably should be located on the extremely edge of the glass and the bus bar thickness should be limited. This limitation as to bus bar thickness provides a limitation to the electroconductivity of the bus bar, hence such ceramic silver bus bars, while they are suitable for adhesion to glass, nevertheless, are extremely fragile and subject to burnouts, which cause disruptions and damage to the transparent electroconductive metal oxide coating on the glass sheet surface.

U.S. Pat. No. 2,813,960 to Egle et al and 3,440,408 to Brittan disclose laminated glass assemblies in which thin wire is used as the heating element. Despite these patents, a need still existed for a bus bar material that is relatively easy to apply and when applied would make a good, permanent electroconductive contact with the elongated wire elements carried by the interlayer material of a laminated window.

U.S. Pat. No. 3,223,829 to Davy et al discloses bus bars consisting essentially of a collodial dispersion of silver and an organic binding agent or cement in alcohol. These bus bars are disposed in contact with a series of heating wires. This material is baked to remove solvent and the material solidified to form a bus bar of silver and the organic binding agent of cement which is worked flat.

U.S. Pat. No. 3,249,466 to Lusher fuses a layer of solder glass containing finely divided paramagnetic material to glass.

U.S. Pat. No. 3,252,829 to Rumstadt et al discloses two bus bars with a lower fusion point than the glass substrate. The bus bars consist essentially of 55.6 percent by weight of silver, 7.8 percent by weight of flux, 18 percent by weight of organic binder and 8.5 percent thinner.

U.S. Pat. No. 3,469,015 to Warren discloses a bus bar of a silver paste consisting of silver flake and a binder resin disposed in a groove in a glass substrate.

U.S. Pat. No. 3,553,833 to Jochim et al discloses bus bars comprising silver strips attached to a glass base by soldering. The attached strips are a suspension of silver and lead borosilicate in an organic base which evaporates upon heating.

U.S. Pat. No. 3,623,906 to Akeyoshi et al discloses bus bars formed of solder applied using a soldering spatula whose tip is at 350° C. during the bus bar application.

U.S. Pat. No. 3,705,047 to Marriott discloses the repair of broken electroconductive heating lines by applying a silver paste containing approximately 70 percent by weight of silver, 5 percent by weight of glass and 25 percent by weight of organic binders and solvents.

The above-identified patents either provide bus bars having a non-electroconductive component (organic binder or ceramic frit) which limits its electroconductivity or bus bars that are applied at elevated temperatures above those usually used in laminating and are not affected during exposure to glass laminating temperatures or bus bars that are applied in the solid state which limits the configuration of substrates to which the bus bars can be applied.

SUMMARY OF THE INVENTION

The present invention relates to a transparent electroconductive window which comprises a non-electroconductive assembly element, an electroconductive circuit portion carried by said element, and a self-soldering bus bar consisting essentially of a mixture of finely divided particles of a highly conductive metal, such as silver, dispersed within a metal alloy having an electroconductive fusion point between about 70° C. and 150° C., said mixture consisting essentially of 85-97 parts by weight of finely divided silver particles and 15-3 parts by weight of said metal alloy. The assembly element is selected from the group consisting of glass and plastic. The glass sheet is any well known commercial glass composition, such as float glases, sheet glass, etc. However, the assembly element may be another rigid transparent material commonly used in laminated windows as a glass substitute such as polycarbonates, acrylic esters and polyesters. Also, the assembly element which carries the electroconductive circuit portion may be an interlayer material such as a polyester, or a polyvinyl acetal such as polyvinyl butyral or a polyurethane, for example.

The electroconductive circuit portion may consist essentially of a transparent electroconductive coating bonded to an assembly element, electroconductive wire carried by an assembly element or narrow electroconductive strips of suitable electroconductive material which may have the same or a different composition than that of the bus bar.

Laminated windows are usually laminated at a temperature not exceeding about 150° C., or slightly above, depending upon the interlayer material used. Therefore, the use of a self-soldering bus bar material consisting essentially of a mixture of finely divided silver particles dispersed within a metal alloy having a fusion point between about 70° C. and about 150° C., which mixture consists essentially of 85-97 parts by weight of silver particles and 15-3 parts by weight of the metal alloy, is capable of self-soldering during a laminating operation and providing a matrix which is also electroconductive. This results in a bus bar of improved electrical conductivity.

The present invention provides an all metallic bus bar containing a highly conductive metal such as silver and a low melting point alloy that can be applied in a liquid composition so that it is capable of being applied in curved as well as straight shapes. The liquid composition is obtained by suspending a mixture of finely divided silver or other highly electroconductive metal particles and finely divided particles of a low melting point alloy in a liquid vehicle, such as pine oil. The amount of liquid vehicle required is a function of the viscosity needed for the method of application desired.

The liquid vehicle containing the finely divided silver and alloy particles may be applied by screening, brushing, spraying, roller coating, doctor blading or other various well known techniques suitable for applying a viscous liquid to a substrate.

The liquid vehicle preferably has the following properties. (1) It must be capable of suspending the finely divided metallic particles (silver and low melting point alloy) uniformly. (2) It preferably evaporates at a temperature below the melting point of the low melting point alloy. (3) If it contains any residue after evaporation, the residue must be capable of separating from the metallic components of the bus bar forming composition during lamination and blend into one of the assembly elements which the residue contacts during said lamination.

In a typical method of making a transparent electroconductive window, one of the assembly elements which carries the electroconductive circuit portion is supported with the circuit portion facing upward, and a mixture of finely divided silver and low melting point alloy particles suspended in a liquid vehicle, such as pine oil, is applied in the form of narrow strips to a pair of opposite edge portions of said circuit portion, a lead terminal is applied to each of said narrow strips, the liquid vehicle is allowed to evaporated and the assembly element so treated is assembled with additional assembly elements to form a sandwich to be laminated. Such sandwich of assembly elements and lead terminals is then subjected to elevated temperature above the melting point of the alloy and sufficient pressure to produce a laminated transparent window. The alloy particles in the narrow strips fuse to the lead terminals, to one or more adjacent assembly elements and to the opposite edge portions of the circuit portion to provide a pair of narrow bus bars for the laminated window. If the window is subjected to stresses that would cause one or both bus bars to become damaged, the application of an electrical potential across the bus bars causes the alloy component of the bus bars to remelt, thereby fusing and repairing the bus bars. The inclusion of a high proportion (preferably 85 to 97 percent by weight) of finely divided silver or other highly electroconductive metals such as gold, platinum, copper, aluminum and the like, insures a high electroconductivity for the bus bars.

A convenient way to apply the narrow strips that become bus bars is by screening. Suitable screening compositions are thixotropic, homogenous pastes the flow readily through a screen on application of pressure. Typical compositions contain from about 30 to about 40 parts of pine oil by weight for 100 parts by weight of particles composed of a mixture of highly conductive metal (silver) and a low melting point alloy.

BRIEF DESCRIPTION OF THE DRAWINGS

In the drawings which form part of the description of the illustrative preferred embodiments which follow.

DESCRIPTION OF THE PREFERRED EMBODIMENT

Figure 1:
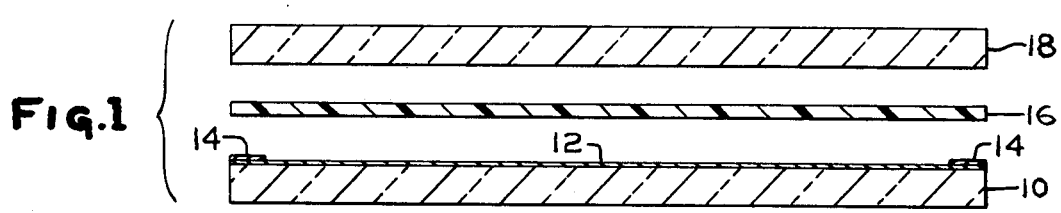
FIG. 1, 2, 3, and 4 are cross-sectional views of different embodiments of the present invention and variations thereof showing how various assembly elements are assembled as sandwiches to be laminated into laminated transparent electroconductive windows according to the present invention.

Referring to the drawings, FIG. 1 discloses an exploded view of various assembly elements which can be assembled to form various sandwiches in the manner shown, and subjected to heat and pressure for lamination. The assembly of FIG. 1 comprises a first sheet of rigid transparent material 10. A transparent electroconductive circuit portion 12 in the form of a continuous coating is bonded to a surface of the sheet rigid transparent material 10 and a pair of bus bars in the form of narrow strips of electroconductive material 14 applied along a pair of opposite side edge portions of the transparent electroconductive coating 12. The transparent electroconductive coating is one embodiment of an electroconductive circuit portion 12 carried by the non-electroconductive assembly element in the form of the sheet of rigid transparent material 10.

In its broadest aspects, the subassembly of a sheet of rigid transparent material 10, electroconductive circuit portion 12 and the bus bar 14 comprises the basic elements of the present invention. In order to provide a preferred embodiment of the present invention, the bus bars are composed of a self-soldering composition consisting essentially of a mixture of finely divided silver particles dispersed within a metal alloy having a fusion point between about 70° and about 150° C. The mixture forming the composition of the narrow strips of electroconductive material which form bus bars 14 consists essentially of 85-97 parts by weight of finely divided silver particles and 15-3 parts by weight of said metal alloy having the low fusion point.

A typical composition of the mixture forming the bus bars 14 contains 95 percent by weight of finely divided silver (325 mesh) and 5 percent by weight of an alloy composed of 52 percent by weight of indium and 48 percent by weight of tin having a melting range of 243°-260° F. (which corresponds to approximately 115°-127° C.). The powdered mixture was blended with pine oil to spreading (doctoring) consistency. The bus bar "paste" so formed was then applied to the electroconductive circuit portion carried by the assembly element to form paste bus bars in electrical contact with the electroconductive circuit portion. The bus bars were dried in air overnight.

The transparent electroconductive coating 12 which forms one embodiment of the electroconductive circuit portion 12 with which the bus bars are in electrical contact may be suitable metal produced by vacuum evaporation or cathode sputtering or metal oxide coating produced by pyrolysis of a suitable metal salt. These techniques are well known in the art of coating sheets of rigid transparent material.

The sheet of rigid transparent material 10 may be either a glass sheet or a well known plastic substitute for glass that is rigid and transparent, such as polycarbonate, acrylic ester or polyester, and the like.

While the subassembly of the sheet of rigid transparent material 10, having an electroconductive circuit portion 12 in the form of a transparent electroconductive coating bonded to a surface thereof and including the narrow strips of special electroconductive material, such as bus bars 14, forms a suitable transparent electroconductive window by itself, it is usually desirable to laminate the subassembly so formed to a sheet of interlayer material 16, usually plasticized polyvinyl butyral or polyurethane. Such a laminate including a layer of interlayer material 16 is usually referred to as a bilayer window and may be produced in the manner taught in U.S. Pat. No. 3,808,077 to Rieser and Chabal, the disclosure of which is incorporated herein by reference.

It is usually desired to protect the outer exposed surface of the layer in interlayer material 16. Accordingly, a second sheet of rigid transparent material 18 which may be composed of any of the materials cited for sheet 10 and may be the same or different from the composition of sheet 10 is included as one of the assembly elements in the sandwich to be laminated to produce the laminated transparent electroconductive window that results from the lamination of the sandwich of assembly elements which comprises sheet 10, layer 16 and sheet 18.

The final lamination of the sheet 10 containing the transparent electroconductive coating 12 as an electroconductive circuit portion and the bus bars 14 to the interlayer material 16 and the sheet of rigid transparent material 18 is usually accomplished at an elevated temperature and pressure. When the aforesaid sandwich was laminated for 30 minutes at a pressure of 200 pounds per square inch (1034 centimeters of mercury) and a temperature of 275° F. (135° C.), the narrow electroconductive strips 14 fused to the electroconductive circuit portion 12 formed by the transparent electroconductive coating to form bus bars while the assembly elements of the sandwich were laminated to one another. The fact that the assembly elements were in pressurized engagement with one another kept the bus bars from spreading unduly, despite the fact that the lamination was conducted at a temperature higher than the melting range of the solder incorporated in the bus bars. Any residue of the pine oil vehicle in which the finely divided silver and alloy particles were suspended blended into the interlayer 16 during the lamination.

Figure 2:
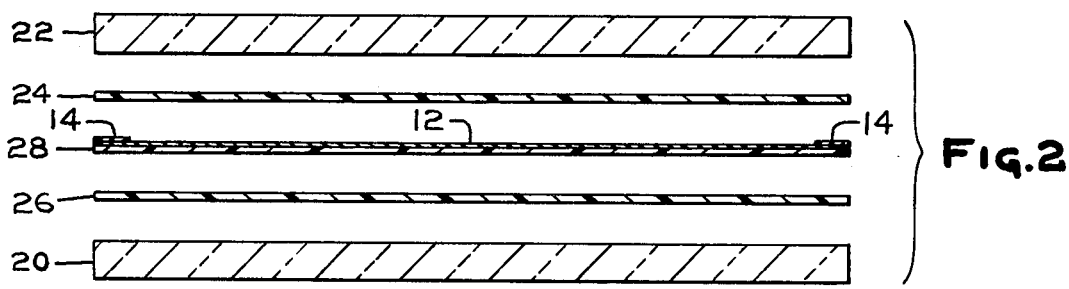

The embodiment of FIG. 2 shows a pair of sheets 20 and 22 of rigid transparent material, which may be similar to sheets 10 or 18 of the first embodiment, a pair of intermediate layers of interlayer material 24 and 26 and a centrally disposed sheet 28 of a polyethylene glycol of terephthalic acid (Mylar) serving as the assembly elements. A transparent electroconductive coating 12 and a pair of bus bars 14 similar to those applied to sheet 10 in the FIG. 1 embodiment are applied to the sheet 28 of this embodiment. The application of the bus bars 14 is made in a manner similar to that of the embodiment in FIG. 1. The assembly elements 20, 22, 24, 26 and 28 are assembled to form a sandwich in the manner shown in exploded view of FIG. 2 and the sandwich subjected to the typical laminating treatment as depicted for the embodiment of FIG. 1.

Figure 3:
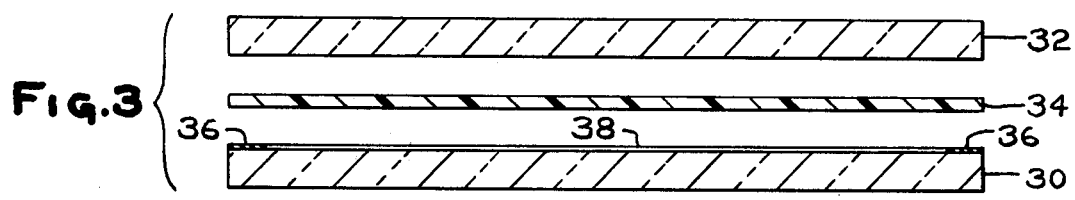

In FIG. 3, a pair of rigid transparent sheets 30 and 32 similar to sheets 10 and 18 and an interlayer 34 similar to interlayers 16, 24 or 26 form a sandwich to be laminated. However, a bus bar composition is applied to a surface of sheet 30 in a pattern that includes a pair of relatively wide bus bars 36 and narrow lines 38 of the bus bar material that interconnect the bus bars 36 and form a second embodiment of an electroconductive circuit portion in lieu of the electroconductive coating 12 of the embodiment of FIGS. 1 and 2. Sheet 20 is then oriented so that its pattern coated surface faces the interlayer 34 when the sandwich is formed. The resulting sandwich is laminated using the same laminating process as for the previous embodiments.

Figure 4:
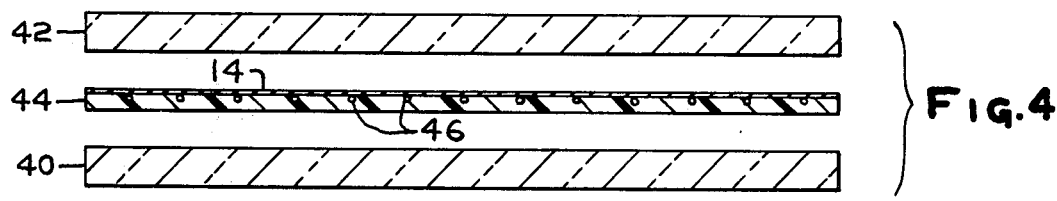

In the embodiment of FIG. 4, a pair of sheets 40 and 42 of rigid transparent material similar to sheets 10 or 18 or 20 or 22 or 30 or 32 is provided with a sheet of interlayer material 44 having embedded therein wires 46. A pair of bus bars 14, better seen in the perspective view of FIG. 5, is applied along the opposite ends of still another embodiment of the electroconductive circuit portion formed by the wires 46.

All of the embodiments include suitable leads 48 which have terminals that connect the bus bars to a source of electrical potential (not shown) in the manner well known in the art. FIG. 5 shows the leads 48 connected to the ends of bus bars 14. However, the lead terminals may be located in any position along the length of the bus bars that is most convenient.

The gist of the present invention is the composition of the bus bars 14 and the manner in which they are applied and become bonded to the transparent electroconductive circuit portions carried by one of the non-electroconductive assembly elements of any of the embodiments depicted herein. It is understood that the layers of interlayer material 24 and 26 of FIG. 2, the layer 34 of FIG. 3 and the layer 44 of FIGS. 4 and 5 may be of any of the materials that are used for the interlayer 16 of the FIG. 1 embodiment.

Figure 5:
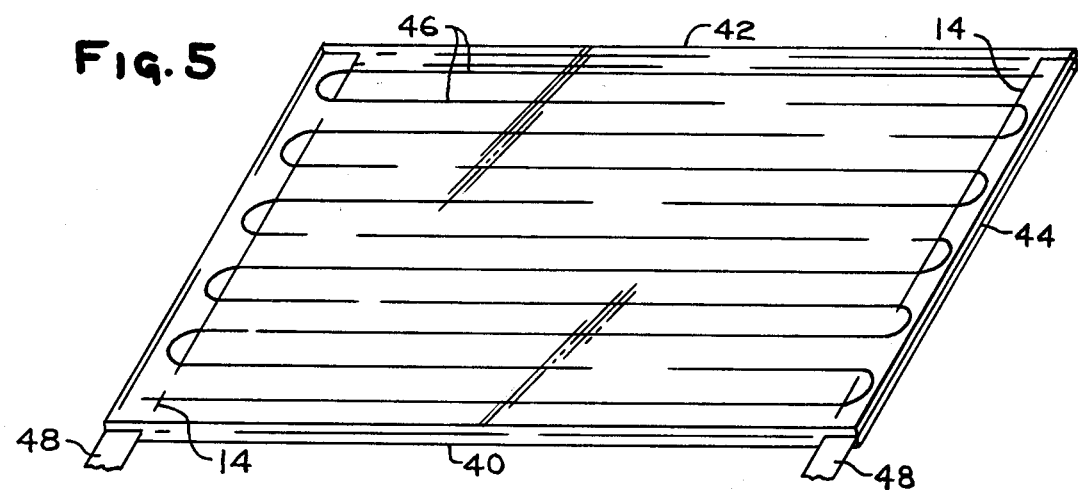
FIG. 5 is a perspective view of the embodiment shown in cross-section in FIG. 4

In the embodiment of FIGS. 4 and 5 the bus bars 14 fuse to the ends of the wires 46 when the assembly is subjected to the elevated temperature and pressure needed for lamination.

The following examples of suitable bus bar composition are given by way of example and not by way of limitation.

EXAMPLE 1

Composition No. 1 of metal particles was made by mixing 95 parts by weight of Silflake 135 (Handy and Harmon, New York) consisting esssentially of 98 percent by weight of flattened silver particles (−325 mesh 90 percent minimum) a maximum of 0.02 weight percent copper and a maximum of 0.05 weight percent of iron with a maximum weight loss of 2 percent after heating so 1000° F. (538° C.), with 5 parts by weight of finely divided (200 mesh) Indalloy No. 1 (Indium Corporation of America, Utica, N.Y.) consisting essentially of 52 percent indium, 48 percent tin by weight. Three parts by weight of composition No. 1 was blended with one part pine oil to develop a paste having a viscosity sufficient for applying by screening. The resulting paste was then screened onto the opposite edge portions of a layer of polyvinyl butyral 30 centimeters long and 15 centimeters wide containing wires embedded therein and extending across the width thereof as depicted in FIGS. 4 and 5. The resulting narrow lines of electroconductive material were air dried overnight. This formed the interlayer containing elements 44, 46 and 14 of FIG. 4. The subassembly so formed was laminated the following day between a pair of glass sheets 15 centimeters by 30 millimeters in an autoclave at approximately 130° C. and 13.6 atmospheres for 45 minutes. The wire terminals appeared to encapsulated into the alloy bus bars 14 that resulted. The resistance of the completed unit was about 30 ohms. The unit operated continuously for 10 days at an input of 12 volts without failure. These units developed 2.5 watts per square inch (0.4 watts per centimeter squared), indicating that good contacts were made between the bus bars and the wires.

EXAMPLE II

Composition No. 2 was made by mixing 90 parts by weight of Silflake 135 (98 percent by weight of flattened silver particles containing a maximum of 0.02 percent by weight of copper and a maximum of 0.05 percent by a weight of iron, and a maximum weight loss of 2 percent after heating to 538° C.) from Handy & Harmon, New York, in a finely pulverized condition (325 mesh — 90 percent minimum) with 10 parts by weight of finely divided fusible alloy No. 125 (Semi-Alloys, Inc., Mt. Vernon, N.Y. 160 mesh. The alloy consisted essentially of 50 percent by weight bismuth, 39 percent by weight lead, 7 percent by weight cadmium, and 4 percent by weight tin. One part by weight of pine oil was added to each three parts of composition No. 2. The resulting paste was screened onto a coated sheet of Mylar about 30 centimeters square to form two elongated strips about 0.95 centimeters wide along a pair of opposite edge portions of the coated surface to form an interlayer containing elements 28, 12 and 14 of FIG. 2. After drying overnight, said interlayer was assembled between a pair of intermediate sheets of polyvinyl butyral 0.38 millimeters thick and a pair of outer glass sheets 3 millimeters thick of matching outline to form a sandwich as in FIG. 2. The latter was laminated in an autoclave at 135° C. and 13.6 atmospheres for 45 minutes. Each resulting bus bar had a resistance along its length of 0.2 ohms. The bus to bus resistance was 2.5 ohms.

In all the Examples described, screening was done at room temperature.

While two specific embodiments of low melting point alloy have been described, it is understood that any low melting point alloy that fuses at a temperature under about 150° C. which is subjected to a laminating temperature at least sufficient to melt the alloy but not so much higher than the alloy melting point as to cause undue spreading when the sandwich is laminated, is suitable. Generally, the melting point of the alloy should be between about 5° C. and about 80° C. below the laminating temperature for the sandwich. The alloy must be capable of mixing readily with the powder of the highly conductive metal in a liquid vehicle such as pine oil, so that the metal particles disperse sufficiently uniformly throughout the metal alloy during laminating and remain uniformly suspended throughout the alloy after the latter resolidifies when the temperature of the sandwich is reduced following the laminating operation.

The material that is used for the screening process, namely in pine oil, is a material that volatilizes during the lamination operation so as to leave a suitable self-soldering bus bar in place where the narrow strip of the electroconductive mixture was applied.

The following table of alloy compositions readily available commercially for combining in 3–15 parts by weight with 97–85 parts by weight of finely divided silver is provided by way of further examples:

TABLE I

| Alloy | Bismuth | Lead | Tin | Cadmium | Melting Point |
|---|---|---|---|---|---|
| No. 1 | 53 | 32 | 15 | | 96° C. |
| No. 2 | 52 | 40 | | 8 | 91.5° C. |
| No. 3 | 50 | 27 | 13 | 10 | 70–72° C. |
| No. 4 | 50 | 25 | 12.5 | 2.5 | 70–72° C. |
| No. 5 | 40 | 40 | 20 | | 111° C. |
| No. 6 | | 32 | 50 | 18 | 145° C. |

EXAMPLE III

Composition No. 3 was made by mixing 90 parts by Silflake 135 with 10 parts of Indalloy No. 1 (see Example I). To three parts of the resulting mixture one part of pine oil was added to form a paste. The paste was applied by silk screening to form strips about 0.95 centimeters wide along the opposite edge portions of a coated surface of a glass sheet 3 millimeters thick and 30 centimeters square. The coating was a transparent electroconductive tin oxide coating. After drying overnight, the coated glass sheet was assembled with a sheet of polyvinyl butyral 0.38 centimeters thick and another sheet of glass which was coated to form a sandwich as in FIG. 1. The sandwich was laminated at 135° C. and 13.6 atmospheres for 45 minutes. Six units of this type survived several weeks of testing at various power levels.

It is understood that other highly electroconductive metals, such as gold, platinum, copper, aluminum and the like and various high melting point highly electroconductive alloys, may be used in the finely divided form instead of silver in the alloy-metal mixture that is applied to form bus bars. However, silver is preferred as it is relatively inexpensive compared to the most highly conductive metals and is more electroconductive than other less expensive, highly electroconductive metals and therefore represents a good compromise ingredient.

The amount of additive, such as pine oil, that is added to the mixture of finely divided electroconductive metal and low melting point alloy particles, depends on the manner of applying the resulting paste to produce the bus bars. Generally, a mixture of about 30 to about 40 parts by weight of pine oil to 100 parts by weight of a silver-alloy mixture is suitable for screening. Other liquid additives that may be substituted for or mixed with pine oil for screening vehicles have a low ash content and include standard well known squeegee oils, alcohols, glycols, petroleum derivatives such as kerosene, coal tars, varnish, and the like. When the electroconductive strips are applied by spraying, water, alcohols and the other volatile organic solvents provided suitable liquid vehicles for the vehicle-particle mixture to be sprayed. Mixtures containing greater proportions of pine oil than used for screening are suitable for spraying.

It is understood that various changes may be made such as using other low melting point alloys such as alloys of bismuth, with lead and tin and alloys of bismuth with lead and cadmium and alloys of bismuth with lead, tin and cadmium such as Woods metal and Lipowitz alloy may be used in addition to those specific examples recited hereinabove in combination with finely divided particles of any highly conductive metal such as silver, gold, copper, aluminum, and high melting point electroconductive alloys.

While the invention shown and described in this disclosure represents an illustrative preferred embodiment and certain modifications thereof, it is understood that the various changes may be made without departing from the gist of the invention defined in the claimed subject matter which follows.

I claim:

1. A transparent electroconductive window comprising a non-electroconductive assembly element of transparent material selected from the group consisting of glass, polycarbonates, acrylic esters, polyesters, polyvinyl acetals and polyurethanes, an electroconductive circuit portion selected from the group of transparent electroconductive coatings, lines of electroconductive material and electroconductive wire carried by said element, and a self-soldering bus substantially all metallic bar consisting essentially of a mixture of finely divided particles of a highly conductive metal selected from the group consisting of silver, gold, platinum, copper and aluminum and high melting point electroconductive alloys within an electroconductive metal alloy having a fusion point between about 70° C. and about 150° C., said mixture consisting essentially of 85-97 parts by weight of particles of said metal and 15-3 parts by weight of said metal alloy.

2. A transparent electroconductive window as in claim 1, wherein said assembly element is selected from the group consisting of glass and plastic and said highly conductive metal is silver.

3. A transparent electroconductive window as in claim 2, wherein said assembly element is a sheet of a polyethylene glycol of terephthalic acid, said electroconductive circuit portion comprises
a transparent electroconductive coating carried by said sheet, and said bus bar is in electroconductive contact with said electroconductive coating.

4. A transparent electroconductive window as in claim 2, wherein said assembly element is a layer of thermoplastic interlayer material, said electroconductive circuit portion comprises electroconductive wire carried by said layer and said bus bar is in electroconductive contact with said wire.

5. A transparent electroconductive window as in claim 2, wherein said assembly element is a rigid sheet of transparent plastic material selected from the group consisting of polycarbonates, acrylic resins and polyester resins.

6. A transparent electroconductive window as in claim 2, comprising a pair of bus bars, each consisting essentially of said mixture of finely divided silver dispersed within said finely divided metal alloy having a fusion point between about 70° C. ann about 150° C.

7. A transparent electroconductive window as in claim 2, wherein said assembly element is a glass sheet, said electroconductive circuit portion comprises a transparent electroconductive coating on a surface of said sheet and said bus bar is bonded to said assembly element in electroconductive contact with said circuit portion.

8. A transparent electroconductive window as in claim 1, wherein said electroconductive circuit portion comprises a plurality of long, narrow elements of the same composition as said bus bar.

9. A transparent electroconductive window as in claim 2, comprising at least one glass sheet laminated to a layer of plastic, said assembly element being selected from the group consisting of said glass sheet and said layer of plastic.

10. A transparent electroconductive window as in claim 9, further including a second glass sheet laminated to said layer of plastic on the side opposite the side to which said one glass sheet is laminated, said assembly element being selected from the group consisting of one of said glass sheets and said layer of plastic.

11. A transparent electroconductive window as in claim 10, wherein said bus bar is one of two bus bars bonded to said assembly element in electroconductive contact with said electroconductive circuit portion along a pair of opposite edge portions of said circuit portion.

12. A transparent electroconductive window as in claim 11, wherein said assembly element is a sheet of a polyethylene glycol of terephthalic acid, said electroconductive circuit portion comprises a transparent electroconductive coating carried by said sheet, said bus bars are bonded to said sheet in electroconductive contact with said coating, further including a pair of glass sheets forming the outermost and innermost layers of said window and an intermediate layer of thermoplastic interlayer material laminated between each of said glass sheets and said assembly element.

13. A transparent electroconductive window as in claim 11, wherein said assembly element is a layer of thermoplastic interlayer material, said electroconductive circuit portion comprises electroconductive wire carried by said layer, said bus bars are in electroconductive contact with said circuit portion, and further including a pair of glass sheets laminated to the opposite surfaces of said layer of interlayer material.

14. A transparent electroconductive window as in claim 2, comprising a pair of rigid transparent sheets taken from the group consisting of glass, polycarbonates, acrylic resins, polyester resins and mixtures of at least two sheets from said group laminated to the opposite surfaces of a layer of thermoplastic interlayer material, wherein said assembly element is one of said pair of rigid transparent sheets, said electroconductive circuit portion is a transparent electroconductive coating carried by said rigid transparent sheet, and said bus is bonded to said rigid transparent sheet in electroconductive contact with said coating.

15. A transparent electroconductive window as in claim 14, wherein said electroconductive circuit portion comprises a plurality of elongated elements of the same composition as said bus bar.

16. A transparent electroconductive window as in claim 14, wherein said thermoplastic interlayer material is polyurethane.

17. A transparent electroconductive window as in claim 14, wherein one of said rigid transparent sheets is a glass sheet.

18. A transparent electroconductive window as in claim 14, wherein said thermoplastic interlayer material is a polyvinyl acetal.

19. A transparent electroconductive window as in claim 18, wherein said polyvinyl acetal is polyvinyl butyral.

* * * * *